United States Patent
Yamamoto

[11] Patent Number: 5,803,857
[45] Date of Patent: Sep. 8, 1998

[54] CONTINUOUSLY VARIABLE TRACTION ROLLER TRANSMISSIONS

[75] Inventor: Takeshi Yamamoto, Yokohama, Japan

[73] Assignee: Nissan Motor Co., Ltd., Yokohama, Japan

[21] Appl. No.: 799,809

[22] Filed: Feb. 13, 1997

[30] Foreign Application Priority Data

Feb. 13, 1996 [JP] Japan .................................. 8-025045

[51] Int. Cl.⁶ ................................................ F16H 15/38
[52] U.S. Cl. ........................... 475/192; 475/216; 476/40
[58] Field of Search ................................... 475/190, 191, 475/192, 197, 216; 476/40

[56] References Cited

U.S. PATENT DOCUMENTS

| | | | |
|---|---|---|---|
| 4,694,704 | 9/1987 | Kraus | 476/40 |
| 5,213,011 | 5/1993 | Nobumoto et al. | 475/216 |
| 5,607,372 | 3/1997 | Lohr | 475/216 |
| 5,676,618 | 10/1997 | Nakano et al. | 476/40 |

FOREIGN PATENT DOCUMENTS 7-167240   7/1995   Japan .

*Primary Examiner*—Charles A. Marmor
*Assistant Examiner*—Sherry Lynn Estremsky
*Attorney, Agent, or Firm*—Foley & Lardner

[57] ABSTRACT

A continuously variable traction roller transmission includes a safety wire for intersectionally interconnecting first ends of trunnions and for securing simultaneousness and equiphase of inclined rotation of traction rollers about oscillation axes thereof, links for connecting the trunnions, and a link support connected to a transmission casing so as to support the links at a center thereof so that the trunnions make synchronous strokes in the opposite directions along the oscillation axes of the traction rollers. The link support has an end located near the safety wire and formed with a recess to obtain a bifurcated form having leg portions fixed to the casing. The safety wire has an intersection located within the recess.

4 Claims, 3 Drawing Sheets

CONTINUOUSLY VARIABLE TRACTION ROLLER TRANSMISSIONS

BACKGROUND OF THE INVENTION

The present invention relates to continuously variable traction roller transmissions.

One of the continuously variable traction roller transmissions is disclosed in JP-A 7-167240. This transmission comprises a continuously variable transmission unit accommodated in a transmission casing and comprising input and output disks oppositely disposed on a main axis and a pair of power rollers disposed between the input and output disks to face each other across the main axis or a rotation axis of the input and output disks for power transmission through frictional engagement therewith.

As for shift control, pistons urge trunnions for rotatably supporting the power rollers to make synchronous strokes in the opposite directions along oscillation axes of the power rollers, each oscillation axis crossing a rotation axis of the power roller at right angles. Thus, the power rollers are inclinedly rotated about the oscillation axes simultaneously and in phase by component forces out of the input and output disks, obtaining stepless shifting.

In order to secure the above synchronous strokes, first ends and second ends of the trunnions are connected with each other by links which have a center portion pivotally supported to a link support through a pin. The link support has both ends mounted to the transmission casing by bolts.

Generally, a safety wire is intersectionally arranged to interconnect the trunnions to inclinedly rotate the power rollers about the oscillation axes simultaneously and in phase as described above.

With the known continuously variable traction roller transmission, however, the safety wire, which is intersectionally arranged to interconnect the trunnions, should have an intersection disposed to be more distant from the main axis than the ends of the link support mounted to the transmission casing, resulting in inevitable increase in radial dimension of the transmission.

It is, therefore, an object of the present invention to provide a continuously variable traction roller transmission which contributes to a reduction in size.

SUMMARY OF THE INVENTION

According to one aspect of the present invention, there is provided a mechanism for a continuously variable transmission including a casing, input and output disks, traction rollers disposed between the disks, each traction roller having a rotation axis and an oscillation axis which crosses the rotation axis at right angles, and support members for rotatably supporting the traction rollers, the mechanism comprising:

a wire arranged to interconnect first ends of the support members, said wire serving to secure simultaneousness and equiphase of inclined rotation of the traction rollers about the oscillation axes thereof, said wire having an intersection;

links arranged to connect the support members; and a link support connected to the casing, said ink support supporting said links at a center thereof so that the support members make synchronous strokes in opposite directions along the oscillation axes of the traction rollers, said link support having an end located near said wire, said end being formed with a recess to obtain a bifurcated form having leg portions, said leg portions being fixed to the casing, said intersection of said wire being located within said recess.

Another aspect of the present invention lies in providing, in a continuously variable transmission:

a casing;

input and output disks accommodated in said casing, said disks being coaxially oppositely disposed on an axis of the transmission;

traction rollers disposed between said disks, said traction rollers facing each other with respect to said axis of the transmission, each traction roller having a rotation axis and an oscillation axis which crosses said rotation axis at right angles;

support members arranged to rotatably support said traction rollers;

a wire arranged to interconnect first ends of said support members, said wire serving to secure simultaneousness and equiphase of inclined rotation of said traction rollers about said oscillation axes thereof, said wire having an intersection;

links arranged to connect said support members; and a link support connected to said casing, said link support supporting said links at a center thereof so that said support members make synchronous strokes in opposite directions along said oscillation axes of said traction rollers, said link support having an end located near said wire, said end being formed with a recess to obtain a bifurcated form having leg portions, said leg portions being fixed to said casing, said intersection of said wire being located within said recess.

DETAILED DESCRIPTION OF THE INVENTION

Figure 1:
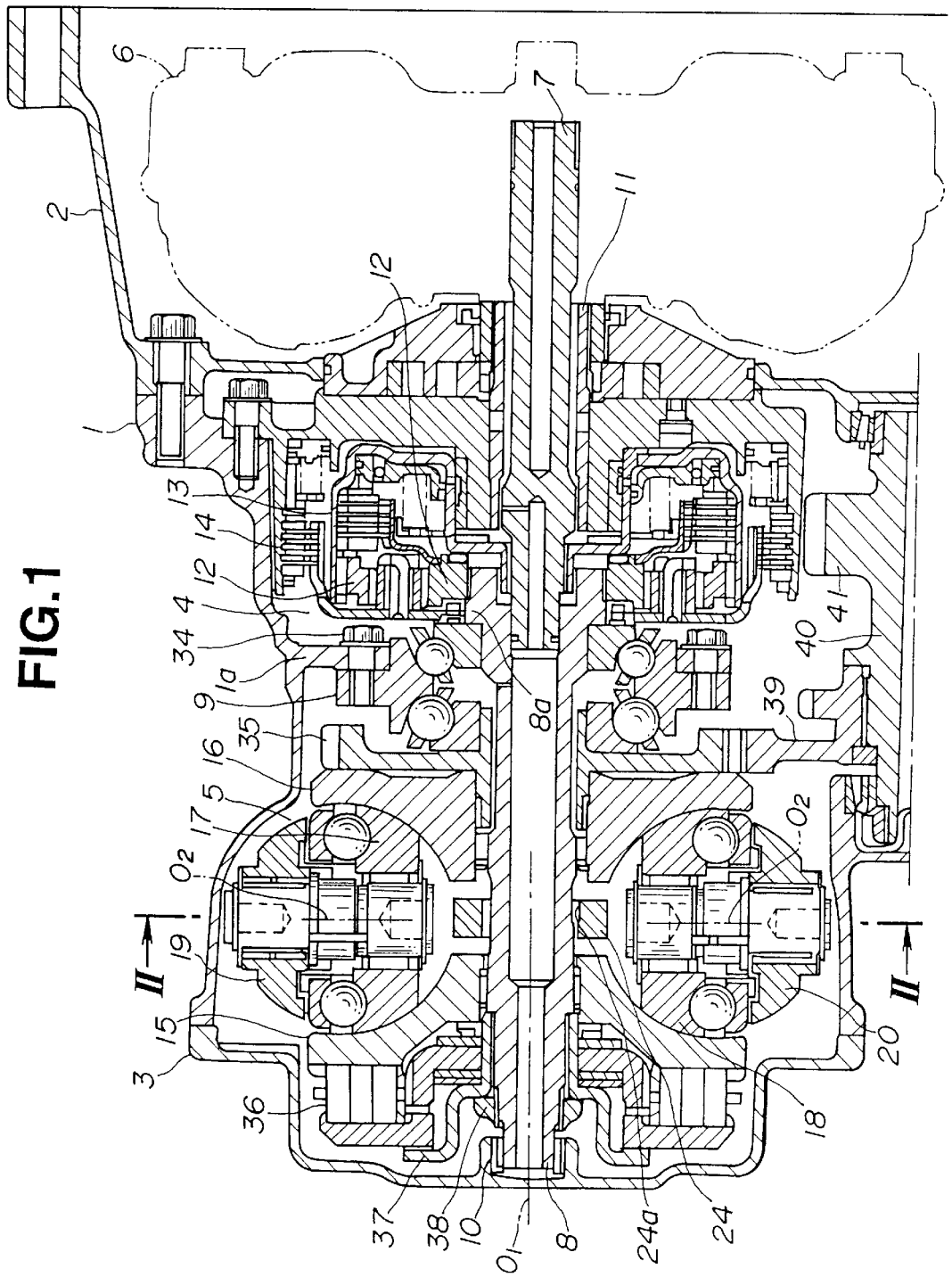
FIG. 1 is a longitudinal section showing a preferred embodiment of a continuously variable traction roller transmission according to the present invention.
Figure 2:
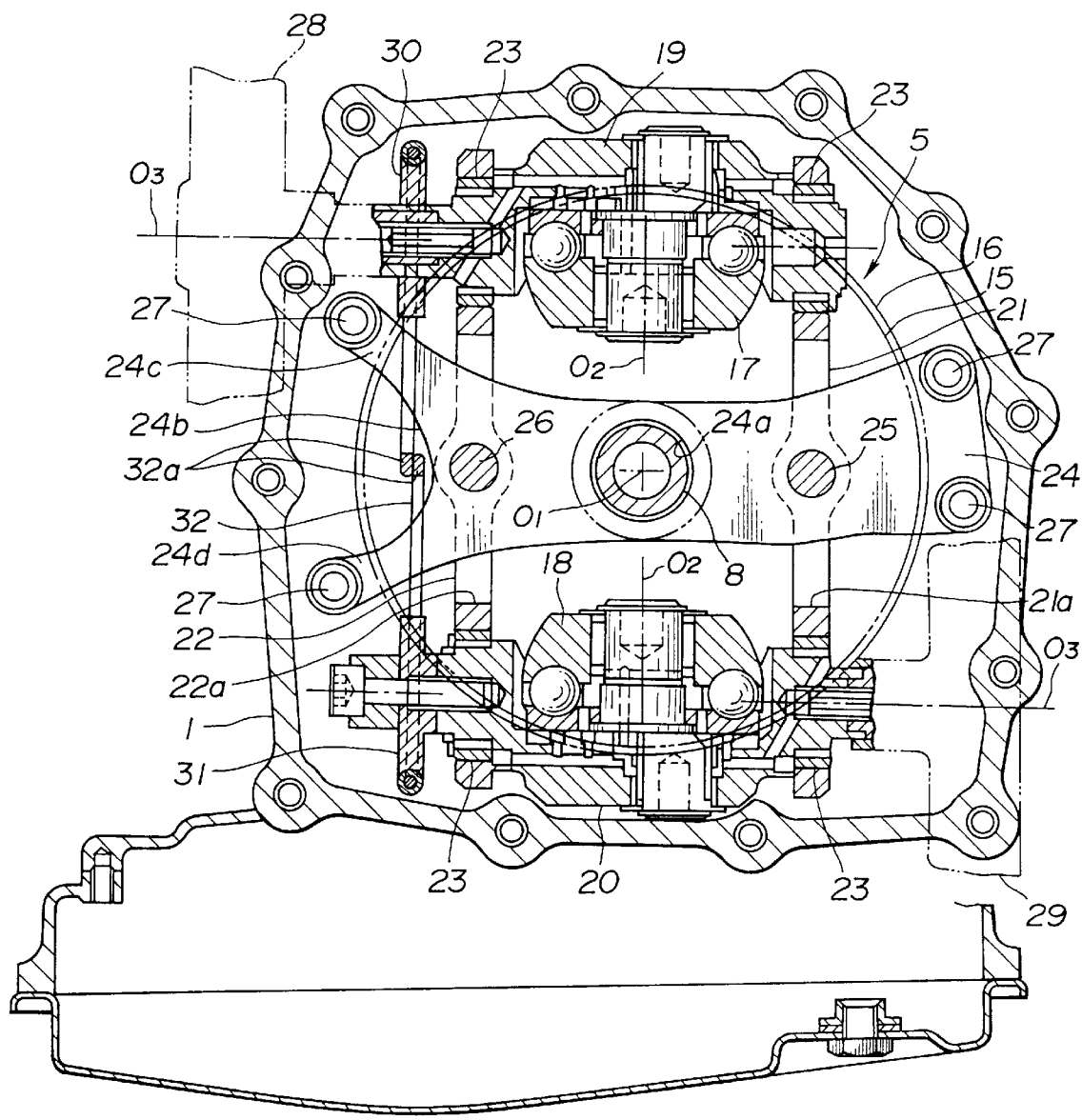
FIG. 2 is a cross section taken along the line II—II in FIG. 1.
Figure 3:
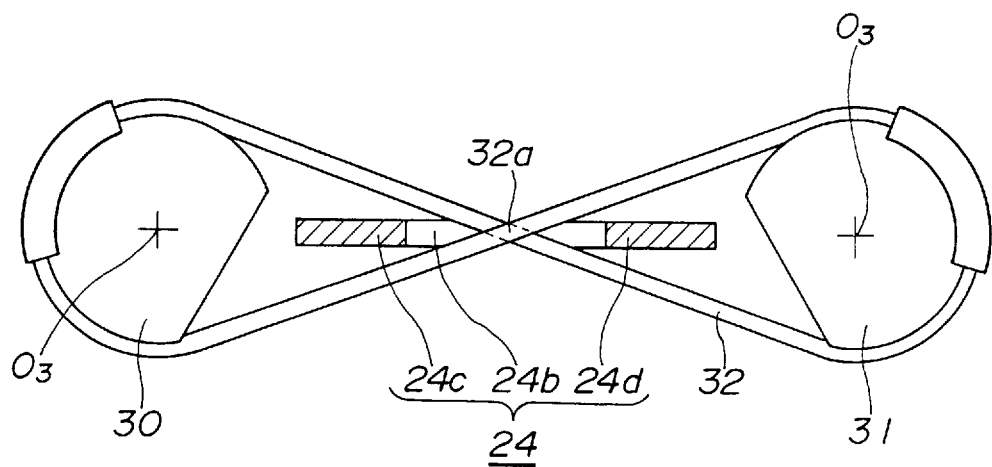
FIG. 3 is a schematic view showing a correlation between a link support and a safety wire.

Referring to FIGS. 1–3, a description will be made with regard to a preferred embodiment of a continuously variable traction roller transmission. Referring first to FIG. 1, the continuously variable traction roller transmission comprises a transmission casing 1, a converter housing 2 integrated therewith at an open front end, and a rear cover 3 integrated therewith at an open rear end.

A holed intermediate wall 1a is integrated with the transmission casing 1 at the center thereof to define front and rear spaces therein. A forward-reverse changeover gear 4 is accommodated in the front space, whereas a continuously variable transmission unit 5 is accommodated in the rear space. A torque converter 6 is accommodated in the converter housing 2.

The forward-reverse changeover gear 4 comprises at the center thereof an input shaft 7, whereas the continuously variable transmission unit 5 comprises at the center thereof a main shaft 8. An end of the input shaft 7 is coaxially rotatably engaged with an end of the main shaft 8. The input shaft 7 is rotatably supported through its end engaged with the main shaft 8 and a hollow stationary shaft 11 connected to the transmission casing 1. The main shaft 8 is rotatably supported in the transmission casing 1 through a radial-thrust bearing 9 arranged on the intermediate wall 1a and a radial needle bearing 10 arranged on the rear cover 3. The input shaft 7 is drivingly connected to an engine, not shown, through the torque converter 6 to receive engine power.

The forward-reverse changeover gear 4 is of the well-known type comprising a simple planetary gear set 12, a forward clutch 13 and a reverse brake 14, and serves to transmit rotation of the input shaft 7 normally through engagement of the forward clutch 13, and inversely through engagement of the reverse brake 14.

The continuously variable transmission unit 5 is of the toroidal type comprising input and output disks 15, 16 coaxially oppositely and rotatably supported on the main shaft 8, and a pair of power or traction rollers 17, 18 disposed between the input and output disks 15, 16 to face each other across a main axis or a rotation axis $0_1$ of the input and output disks 15, 16 for power transmission through frictional engagement therewith.

The power rollers 17, 18 are rotatably supported to trunnions or traction-roller support members 19, 20, respectively. Referring to FIG. 2, each trunnion 19, 20 is arranged to extend along an oscillation axis $0_3$ of each power roller 17, 18 which crosses a rotation axis $0_2$ thereof at right angles. First ends and second ends of the trunnions 19, 20 are rotatably inclinably connected with each other by links 22, 21 through ball joints 23.

The links 22, 21 are formed at the center thereof with rectangular holes 22a, 21a, and have center portions pivotally supported to a link support 24 by pins 25, 26, the link support 24 being arranged through the rectangular holes 22a, 21a. Thus, the link support 24 is located between the input and output disks 15, 16 to extend in the direction perpendicular to the rotation axis $0_1$ thereof. It is noted that the size of the link support 24 is determined to allow insertion thereof from the open rear end of the transmission casing 1 in the state perpendicular to the axis $0_1$ of the transmission casing 1 as shown in FIG. 2. Four corners of the link support 24 are fixed to the transmission casing 1 by bolts 27. Thus, the center portions of the links 22, 21 are indirectly rotatably supported to the transmission casing 1, which urges the trunnions 19, 20 to make synchronous strokes in the opposite directions along the oscillation axes $0_3$ of the power rollers 17, 18. Of course, the link support 24 has a round hole 24a for receiving the main shaft 8.

As seen in FIG. 2, arranged at the first end of the trunnion 19 and the second end of the trunnion 20 are piston cylinder devices 28, 29 for urging the trunnions 19, 20 to make strokes in the opposite directions along the oscillation axes $0_3$ of the power rollers 17, 18. Strokes of the trunnions 19, 20 in the opposite directions make the power rollers 17, 18 to have the rotation axes $0_2$ offset from the main axis or rotation axis $0_1$ of the input and output disks 15, 16, which produces inclined rotation of the power rollers 17, 18 about the oscillation axes $0_3$ thereof simultaneously and in phase, enabling shifting as will be described later. Referring to FIG. 3, a safety wire 32 is intersectionally arranged to interconnect pulleys 30, 31 fixed to the trunnions 19, 20 so as to secure simultaneousness and equiphase of inclined rotation of the power rollers 17, 18.

Arrangement of the safety wire 32 will be described in detail. Referring to FIGS. 2 and 3, an end of the link support 24 located near the safety wire 32 is formed with a recess 24b extending to the vicinity of a link support pin 26 so as to obtain a bifurcated form having leg portions 24c, 24d. Pointed ends of the leg portions 24c, 24d are fixed to the transmission casing 1 by bolts 27.

The safety wire 32 is arranged to have an intersection 32a located within the recess 24b. This is a determinant of a fixed position of the pulleys 30, 31 with respect to the trunnions 19, 20.

Referring to FIG. 1, the radial-thrust bearing 9 is held by a stepped portion 8 of the main shaft 8 so as not to be disengaged therefrom, and is connected to the intermediate wall 1a by a bolt 34. An output gear 35 is interposed between the radial-thrust bearing 9 and the output disk 16. The output gear 35 is spline-connected to the output disk 16, and is rotatably supported to the main shaft 8.

A loading cam 36 is disposed distant from the output disk 16 and adjacent to the input disk 15, and is drivingly connected to the main shaft 8 through a drive plate 37. The drive plate 37 is held by a loading nut 38 engaged with the main shaft 8 so as not to be disengaged therefrom. The continuously variable transmission unit 5 is axially compressed between the stepped portion 8a and the loading nut 38 for preassembling.

A counter gear 39 engaged with the output gear 35 is arranged to a first counter shaft 40 with which a counter gear 41 is formed to obtain rotation after stepless shifting.

The operation of this embodiment will be described. Referring to FIG. 1, rotation transmitted to the input shaft 7 via the torque converter 6 is in turn transmitted to the main shaft 8 normally or inversely through the forward-reverse changeover gear 4. Rotation of the main shaft 8 is transmitted to the input disk 15 via the drive plate 37 and the loading cam 36, which is then transmitted to the output disk 16 through rotation of the power rollers 17, 18 about the rotation axes $0_2$ thereof. The loading cam 36 produces thrust in accordance with transmitted torque to bias the input disk 15 to the output disk 16, securing frictional engagement of the input and output disks 15, 16 with the power rollers 17, 18, thus enabling the above transmission. Rotation of the output disk 16 is output via the gears 35, 39, 41 in this order.

Next, shift control will be described. Referring to FIG. 2, when the piston cylinder devices 28, 29 urge the trunnions 19, 20 to make strokes in the opposite directions along the oscillation axes $0_3$ of the power rollers 17, 18, the power rollers 17, 18 have the rotation axes $0_2$ offset from the rotation axis $0_1$ of the input and output disks 15, 16. Thus, the power rollers 17, 18 receive component forces out of the input and output disks 15, 16, and are inclinedly rotated about the oscillation axes $0_3$ thereof. Due to continuous change in the diameter of a circle defined by the power roller 17, 18 and the input and output disks 15, 16 frictionally engaged therewith, the transmission ratio between the input and output disks 15, 16 or the speed ratio can be changed steplessly. When the speed ratio reaches a predetermined ratio, the piston cylinder devices 28, 29 urge the trunnions 19, 20, according to the well-known feedback control, to return the power rollers 17, 18 to a position with zero offset from the rotation axis $0_1$ of the input and output disks 15, 16, maintaining the predetermined speed ratio.

According to this embodiment, the structure is devised with respect to the safety wire 32, i.e. referring to FIG. 2, the end of the link support 24 located near the safety wire 32 is formed with the recess 24b to obtain a bifurcated form having the leg portions 24c, 24d with the pointed ends fixed to the transmission casing 1 by the bolts 27, and the safety wire 32 is arranged to have the intersection 32a located within the recess 24b. Thus, regardless of existence of the intersection 32a, the safety wire 32 can be arranged nearer the center $0_1$ of the transmission than the corresponding end of the link support 24 mounted to the transmission casing 1, resulting in a possible reduction in radial dimension of the transmission.

Figure 4:
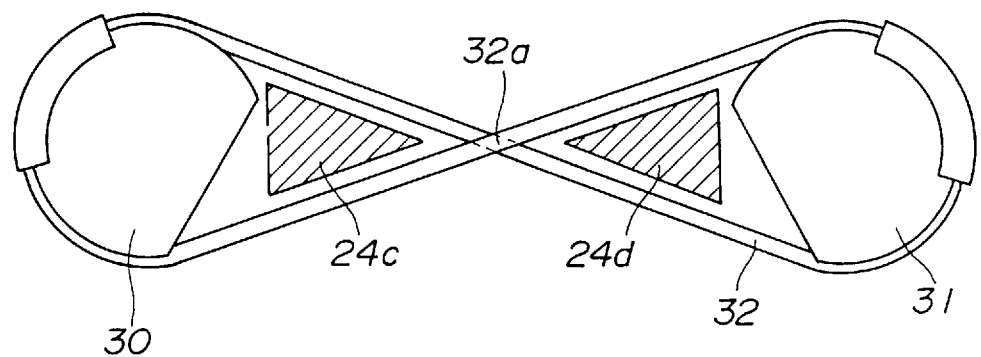
FIG. 4 is a view similar to FIG. 3, showing another preferred embodiment of the present invention.

However, according to this embodiment, the link support 24 is thinned at the leg portions 24c, 24d as seen in FIG. 2, which causes inevitable lowering of the strength. Referring to FIG. 4, another embodiment is conceived to increase the strength at the leg portions 24c, 24d of the link support 24. Specifically, each leg portion 24c, 24d is formed with a section substantially corresponding to a triangle defined by the safety wire 32 between the intersection 32a and the trunnion 19, 20, to be exact, the pulley 30, 31.

According to another embodiment, the leg portions 24c, 24d of the link support 24, which has a bifurcated form, and thus reduced strength, can be formed with a larger sectional area, contributing to an increase in the strength.

Having described the present invention in connection with the preferred embodiments, it is noted that the present invention is not limited thereto, and various changes and modifications can be made without departing from the spirit of the present invention.

What is claimed is:

1. A mechanism for a continuously variable transmission including a casing, input and output disks, traction rollers disposed between the disks, each traction roller having a rotation axis and an oscillation axis which crosses the rotation axis at right angles, and support members for rotatably supporting the traction rollers, the mechanism comprising:

a wire arranged to interconnect first ends of the support members, said wire serving to secure simultaneousness and equiphase of inclined rotation of the traction rollers about the oscillation axes thereof, said wire having an intersection;

links arranged to connect the support members; and a link support connected to the casing, said link support supporting said links at a center thereof so that the support members make synchronous strokes in opposite directions along the oscillation axes of the traction rollers, said link support having an end located near said wire, said end being formed with a recess to obtain a bifurcated form having leg portions, said leg portions being fixed to the casing, said intersection of said wire being located within said recess.

2. A mechanism as claimed in claim 1, wherein each of said leg portions is formed with a section substantially corresponding to a triangle defined by said wire between said intersection and each of said support members.

3. In a continuously variable transmission:

a casing;

input and output disks accommodated in said casing, said disks being coaxially oppositely disposed on an axis of the transmission;

traction rollers disposed between said disks, said traction rollers facing each other with respect to said axis of the transmission, each traction roller having a rotation axis and an oscillation axis which crosses said rotation axis at right angles;

support members arranged to rotatably support said traction rollers;

a wire arranged to interconnect first ends of said support members, said wire serving to secure simultaneousness and equiphase of inclined rotation of said traction rollers about said oscillation axes thereof, said wire having an intersection;

links arranged to connect said support members; and a link support connected to said casing, said link support supporting said links at a center thereof so that said support members make synchronous strokes in opposite directions along said oscillation axes of said traction rollers, said link support having an end located near said wire, said end being formed with a recess to obtain a bifurcated form having leg portions, said leg portions being fixed to said casing, said intersection of said wire being located within said recess.

4. A continuously variable transmission as claimed in claim 3, wherein each of said leg portions is formed with a section substantially corresponding to a triangle defined by said wire between said intersection and each of said support members.

* * * * *